(12) United States Patent
Berends

(10) Patent No.: US 12,593,133 B2
(45) Date of Patent: Mar. 31, 2026

(54) TRACKING SYSTEM

(71) Applicant: MELOFLOW INNOVATIONS B.V.,
Hazerswoude-Doup (NL)

(72) Inventor: Erik Johannes Martinus Berends,
Utrecht (NL)

(73) Assignee: MELOFLOW INNOVATIONS B.V.,
Hazerswoude-Doup (NL)

( * ) Notice: Subject to any disclaimer, the term of this
patent is extended or adjusted under 35
U.S.C. 154(b) by 0 days.

(21) Appl. No.: 19/201,161

(22) Filed: May 7, 2025

(65) Prior Publication Data

US 2025/0267370 A1     Aug. 21, 2025

Related U.S. Application Data

(63) Continuation of application No.
PCT/NL2024/050355, filed on Jul. 2, 2024.

(30) Foreign Application Priority Data

Jul. 9, 2023     (NL) ..................................... 2035316

(51) Int. Cl.
    *H04N 23/695*      (2023.01)
    *H04N 7/18*        (2006.01)
    *H04N 23/69*       (2023.01)
(52) U.S. Cl.
    CPC ........... *H04N 23/695* (2023.01); *H04N 7/188*
          (2013.01); *H04N 23/69* (2023.01)
(58) Field of Classification Search
    CPC ....... H04N 23/695; H04N 23/69; H04N 7/188
    See application file for complete search history.

(56) References Cited

U.S. PATENT DOCUMENTS

| | | | |
|---|---|---|---|
| 9,921,058 B2 * | 3/2018 | Sinha | G01B 21/00 |
| 2018/0292809 A1 * | 10/2018 | Farnik | G05B 19/416 |
| 2019/0364642 A1 | 11/2019 | Feeney | |
| 2020/0184222 A1 | 6/2020 | Mizerak et al. | |
| 2021/0392462 A1 | 12/2021 | Feeney | |

* cited by examiner

*Primary Examiner* — Kathleen V Nguyen
(74) *Attorney, Agent, or Firm* — Jordan IP Law, LLC;
Todd A. Vaughn

(57) ABSTRACT

A tracking system for illuminating with a light bundle from
a directable light bundle generator a performer at a tracked
location on a performance environment. A camera input is to
receive a camera stream from a camera arranged for viewing
on the performance environment, and a display output is to
output a display stream. A controller is configured to: obtain
a camera placement of the camera relative to the perfor-
mance environment, obtain a camera orientation of the
camera relative to the performance environment obtain a
directable light bundle generator placement of the directable
light bundle generator relative to the performance environ-
ment, obtain a directable light bundle generator orientation
of the directable light bundle generator relative to the
performance environment, receive the camera stream from
the camera input, obtain the tracked location, calculate a 2D
projection of the light bundle at the tracked location based
on the tracked location, the camera placement, the camera
orientation, the directable light bundle generator placement
and the directable light bundle generator orientation, insert
a light bundle indicator for indicating the 2D projection of
the light bundle in the camera stream for generating the
display stream, and provide the display stream to the display
output.

18 Claims, 5 Drawing Sheets

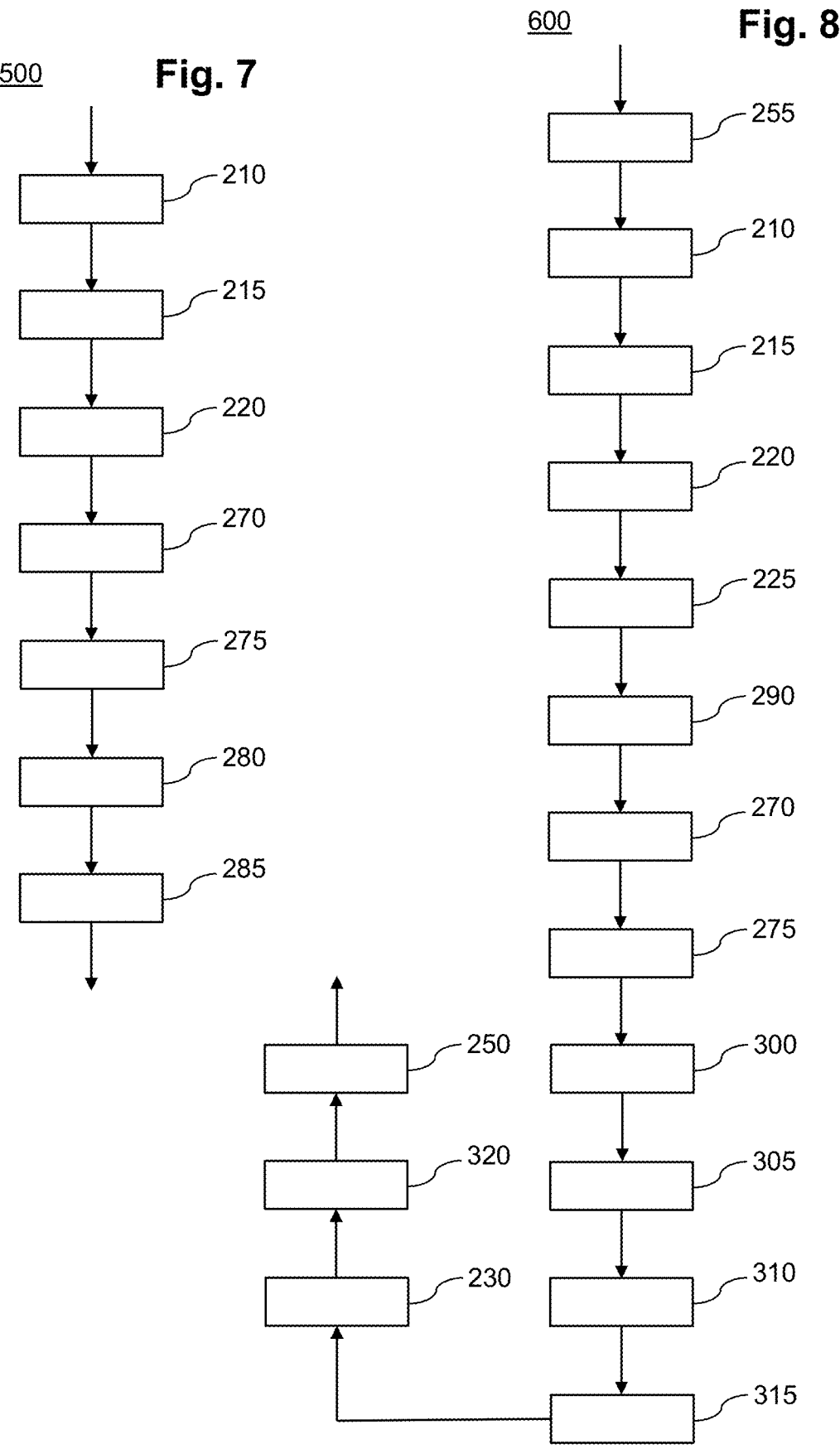

1000

1010   1020

TRACKING SYSTEM

CROSS REFERENCE TO RELATED APPLICATIONS

Figure 1:
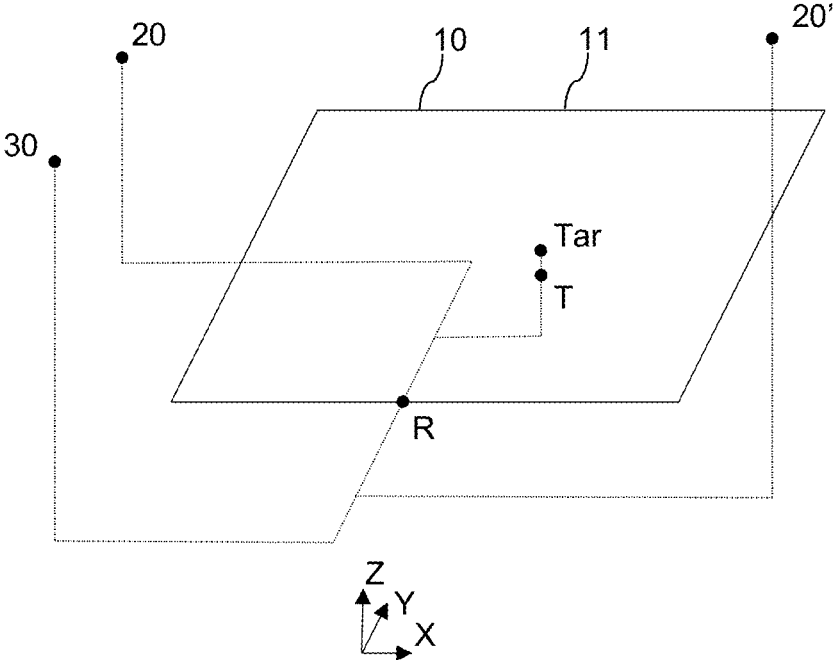

The present application is a continuation of International Application No. PCT/NL2024/050355 (filed on Jul. 2, 2024), which itself claims priority to Dutch Patent Application No. 2035316 (filed on Jul. 9, 2023), each of which is hereby incorporated by reference in their complete entireties.

FIELD OF THE INVENTION

The present disclosure relates to a tracking system for tracking a performer in a performance environment. More specifically, the present disclosure relates to additional indicators in the display stream of and/or use of a pan-tilt-zoom camera stream provided to the tracking system for improved tracking of the performer.

BACKGROUND

To emphasize the visual presence of a performer, on stage spots may be used placing the performer in a light bundle, while the background of the stage is not or less illuminated. As a performer typically moves across the stage, the bundle of the spot may follow the performer. The spot following the performer across the stage is named a follow spot. A follow spot may be operated manually.

Another solution is tracking the performer on the stage with the help of a camera and screen. Although this type of system is already known at least from 2012 onwards in this technical field, a more recent disclosure can be found in European Patent Publication No. EP3868137 (A1). European Patent Publication No. EP3868137 (A1) discloses a computer implemented system and method for the control of output changes to a media source and/or other sources where the sources and medias inputs and outputs can be changed based on the acquisition of physical properties of a target. Where targets can be acquired either passively, actively, with line of sight, remotely or by various means in turn outputs of various sources including but not limited to lighting, audio, video, projection, laser, media, machines mechanical, electronic or other can be caused to change based on positional acquisition.

U.S. Patent Application Publication No. 2018/0292809 A1 discloses a follow spot controller and method. The follow spot controller and method are provided that store first and second sets of individual pan and tilt parameters for each of a plurality of automated luminaires and calibrate a 3-D model of a surface of a performance area and location and mounting orientations of the automated luminaires relative to the performance area, based on the stored sets of individual pan and tilt parameters. A physical orientation of the follow spot controller is sensed and operator pan and tilt parameters are sent to one of the automated luminaires. The operator pan and tilt parameters are based on the physical orientation of the follow spot controller. Individual calculated pan and tilt parameters are sent to each of the other automated luminaires. The individual calculated pan and tilt parameters are based on the operator pan and tilt parameters and the 3-D model.

U.S. Patent Application Publication No. 2020/184222 A1 discloses that a lighting fixture at a venue is controllable using augmented reality on a user-device that displays virtual elements on an image of the lighting fixture and/or a scene at the venue. User input for controlling the lighting fixture is received via the virtual elements and a signal is transmitted by the user device to alter the lighting fixture in the venue based on the user input. The virtual elements change in the display to reflect the change of state of the actual lighting fixture. Altering the lighting fixture includes changing brightness, color, or focus of light, or changing a position of the lighting fixture. The virtual elements may include a selection box around the lighting fixture, manufacturer data, channel numbers, DMX addresses, diagnostic information, a slider, a switch, a knob, a button, a virtual lighting shutter, pan/tilt axes, a moveable virtual beam of light, or a scenery element.

U.S. Patent Application Publication No. 2019/364642 A1 discloses a user-operated spotlight system and method for lighting a performer on a stage or performance space; the user-operated spotlight system comprising a screen which displays an image of the stage and a cursor, a screen cursor positioner adapted to be operated to move the cursor on the screen, a processor connected to the screen, and, a plurality of controllable spotlights which are connected to the processor and which plurality of controllable spotlights can be moved by a user moving the cursor on the screen. The advantage of providing such a user-operated spotlight system is that a single user can operate a plurality of spotlights.

A disadvantage of the disclosed system and method is that changes of the mouse on the screen do not proportionally relate to changes in the position of the performer on the stage making the change dependent on the location of the performer on the stage. This results in a non-natural control. Furthermore, a change in X direction compared with an equal same change in Y direction on the screen does not relate to a comparable change in X and Y directions of the follow spot on the stage. Furthermore, depending on the camera position, the resolution changes over the screen with which accuracy the target location can be pointed at with the mouse on the screen. One or more of these disadvantages become even more prominent when the camera views the stage from a corner.

SUMMARY

An object of the present disclosure is to overcome one or more of the disadvantages mentioned above.

According to a first aspect of the present disclosure, a tracking system for illuminating with a directable light bundle generator a performer at a tracked location on a performance environment, wherein the performer has a performer height; the tracking system comprising: a camera input for receiving a camera stream from a camera arranged for viewing on the performance environment, wherein the camera stream represents a 2D view on the performance environment of the camera; a display output for outputting a display stream; and a controller arranged for: obtaining a camera placement of the camera relative to the performance environment; obtaining a camera orientation of the camera relative to the performance environment; obtaining the tracked location; obtaining a height offset based on the performer height; receiving the camera stream from the camera input; calculating a base location based on the tracked location and the height offset; calculating a 2D base location based on the camera placement, the camera orientation, and the base location; inserting a base indicator for indicating the 2D base location in the camera stream for generating the display stream; and providing the display stream to the display output.

A tracking system is a system used for tracking a tracked location in a performance environment. The performance environment comprises décor and stage. The décor may comprise sloped or vertical parts of the performance environment. The décor typically comprises parts of the performance environment whereupon the performer may not or cannot walk. Typically, a performer is at the tracked location on the stage. The stage may comprise flat surfaces, elevations, stairs, moving parts, such as lifts, and/or sloped parts, typically whereon the performer may walk.

The tracking system typically is used for controlling a directable light bundle generator. The tracking system may be arranged for controlling multiple directable light bundle generators all focussing on or direct to one tracked location from different angles and/or locations. The tracking system may be arranged for controlling multiple directable light bundle generators for tracking multiple tracked locations on the performance environment. The directable light bundle generator generates a light bundle which is directable for lighting up a location in 3D space. The directable light bundle generator may be a follow spot, an automated fixture and/or a beamer.

The camera input is arranged for receiving a camera stream from a camera. The camera input may be a custom type input or a standardized type, such as SDI, more specific SDI over coaxial cables with BNC connectors, HDMI, Ethernet, USB or COM port. The camera stream may be according to a custom protocol or standardized protocol. The camera stream may be according to a video streaming protocol, such as SMPTE, H.264, MPEG, ONVIF, HLS, RTMP, WebRTC, SRT, RTSP, or MPEG-DASH. The camera providing the stream to the camera input is arranged for viewing on the performance environment. The camera stream represents a 2D view on the performance environment of the camera. The camera stream may view, such as an angled view, on the stage. The camera stream may view the performance environment without viewing on the stage.

The display output is arranged for outputting a display stream. The display output may be a custom type input or a standardized type, such as HDMI, Ethernet, USB or COM port. The display stream may be according to a custom protocol or standardized protocol. The display stream may be according to a video streaming protocol, such as H.264, MPEG, ONVIF, HLS, RTMP, WebRTC, SRT, RTSP, or MPEG-DASH. The display receiving the stream from the display output is arranged for displaying the display stream. The controller is arranged for performing several steps. The controller may be a custom controller or a controller incorporated into e.g. a general-purpose computer having appropriate processing power accepting and producing the different streams. The controller is arranged for performing the steps in parallel and/or different order, where other requirements do not impose a specific sequence of the steps. The steps that the controller is arranged for are: obtaining the camera placement; obtaining the camera orientation; obtaining the tracked location; obtaining the height offset; receiving the camera stream; calculating the base location; calculating the 2D base location; inserting the base indicator; and providing the display stream.

The camera placement is the camera relative to the performance environment. Typically, a reference point and/or reference axis is arranged somewhere in the performance environment, more specific somewhere on the stage. As an example, the centre of the stage or middle on the front of the stage facing the public may be selected as reference point. Reference axis may be selected as X direction parallel to the front of the public/the stage to the right for the public, Y direction from the stage straight away from the public and straight into the stage, and Z direction straight up from the stage.

The camera orientation of the camera relative to the performance environment. The camera orientation is typically specified relative to the reference axis. The camera orientation may be expressed in a pan and a tilt value.

The tracked location is the location that is lighten up by the light bundle of the directable light bundle generator. The light bundle of the directable light bundle generator typically has a centre line. The centre line may be an axis of symmetry or partial symmetry of the light bundle. The centre line typically coincides with the tracked location. The light bundle is typically conical and the centre line is typically the symmetry line of the cone. The tracked location is typically not arranged to the top of the head of the performer, but slightly lower. This provides the effect of lighten up the face or the head of the performer. This may further provide the effect to partly lighten up the shoulders of the performer. Furthermore, this provides that the amount of light from the light bundle of the directable light bundle generator that does not strike the performer is minimized. Minimizing the light that does not strike the performer has the advantages of increasing the contrast between the performer, specifically the face of the performer, and the performance environment, such as the stage and/or décor. The increased contrast provides the advantage of improved showing of the performer in the performance environment, specifically on the stage.

The height offset is based on the performer height. The height offset is typically or based on the distance between the tracked location and the performance environment, such as the stage. The height offset is slightly lower than the performer height for providing the advantage of increased contrast as described above. The performer height is the height of the performer from toe to top of the head when standing straight up.

The base location is based on the tracked location and the height offset. Or in other words, the base location, the tracked location, and the height location relate to each other. Typically, if two are known, the third may be deduced. The base location typically is where the feet of the performer touch the stage, even more precise, the middle between the feet or where the perpendicular line from the centre of mass of the body of the performer intersect with the stage.

The 2D base location is based on the camera placement, the camera orientation, and the base location. Based on the camera placement and the camera orientation, the base location may be transformed to the 2D base location by projecting the 3D performer environment onto the 2D display surface. As an example, when the base location is represented by a 3D vector and the 2D base location by a 2D vector, the transformation may be presented by multiplying a 3×2 matrix with the base location for obtaining the 2D base location. The 3×2 matrix is based on the camera placement and the camera orientation the base location. A placement of an object may comprise an attitude of the object, such as an angular deviation or rotation relative to Cartesian axis having an origin at a specified location of that object, and/or a position of the object, such as an X, Y, Z position of the object, relative to another position, typically the origin of Cartesian axis. An orientation of an object typically comprises two of the three axes determining an attitude of the object. An orientation of an object may comprise a tilt and a pan value of that object.

The base indicator is for indicating the 2D base location in the camera stream for generating the display stream. The base indicator may have any shape, form and/or size. The base indicator is typically detectable by a human operator of the tracking system. The base indicator provides a reference to the operator. The reference to the operator is relative to the tracked location. The base location, typically associated with the stage where the performer is located, provides the base or projection of the tracked location onto the stage.

The operator of the tracking system when tracking the performer with the directable light bundle generator may have difficulties manipulating the tracked location for following or tracking the performer as the tracked location is a floating point in 3D space being the performance environment.

The current tracking system advantageously allows the operator to associate the based indicator with the point in space, typically on the stage, where the performer is located, such as where the feet of the performer contact the stage. When manipulating the tracking location, the associated base location is changing as well thereby advantageously improving the intuitive control of the tracked location. Practise has shown that without the base indicator, the operator is more likely to overshoot and/or undershoot when tracking the performer. This intuitive control of the tracked location becomes even more apparent when the stage has different levels such as a sloped surface or a stepped part of the stage. When the operator over- or undershoots when tracking the performer, due to the different levels in the stage, the tracked location and consequently the light bundle of the directable light bundle generator may change in the Z-direction in such a way that the performer is not or partly not lighten up.

The improved tracking of the performer, resulting in less under- and/or overshoot, allows to reduce the cross-sectional size of the light bundle of the directable light bundle generator. The reduced cross-sectional size while still lighting up the performer provides the advantage of less light lighting up the performance environment. The light falling onto the performer and not or not as much on the performance environment provides a contrast as described above. The reduced amount of light lighting up the performance environment has the technical effect of increasing the contrast between the performer and the performance environment.

According to another aspect of the present disclosure, a tracking assembly comprising: a tracking system according to any of the embodiments or other aspects of the present disclosure; a camera couplable to the camera input of the tracking system; and a display couplable to the display output of the tracking system. The tracking assembly provides the same advantages as described for the other aspects or embodiments of the present disclosure.

According to another aspect of the present disclosure, a computer implemented method for illuminating with a directable light bundle generator a performer at a tracked location on a performance environment, wherein the performer has a performer height, comprising: obtaining a camera placement of a camera arranged for viewing on the performance environment, wherein the camera placement is relative to the performance environment; obtaining a camera orientation of the camera relative to the performance environment; obtaining the tracked location; obtaining a height offset based on the performer height; receiving a camera stream from the camera, wherein the camera stream represents a 2D view on the performance environment of the camera; calculating a base location based on the tracked location and the height offset; calculating a 2D base location based on the camera placement, the camera orientation, and the base location; inserting a base indicator for indicating the 2D base location in the camera stream for generating the display stream; and providing the display stream to a display. The computer implemented method provides the same advantages as described for the other aspects or embodiments of the present disclosure.

According to another aspect of the present disclosure, a tracking system for illuminating with a light bundle from a directable light bundle generator a performer at a tracked location on a performance environment, comprising: a camera input for receiving a camera stream from a camera arranged for viewing on the performance environment, wherein the camera stream represents a 2D view on the performance environment of the camera; a display output for outputting a display stream; and a controller arranged for: obtaining a camera placement of the camera relative to the performance environment; obtaining a camera orientation of the camera relative to the performance environment; obtaining a directable light bundle generator placement of the directable light bundle generator relative to the performance environment; obtaining a directable light bundle generator orientation of the directable light bundle generator relative to the performance environment; receiving the camera stream from the camera input; calculating a 2D projection of the light bundle based on the camera placement, the camera orientation, the directable light bundle generator placement and the directable light bundle generator orientation; inserting a light bundle indicator for indicating the 2D projection of the light bundle in the camera stream for generating the display stream; and providing the display stream to the display output.

For this aspect of the present disclosure, the controller is arranged for the steps of: obtaining a camera placement; obtaining a camera orientation; obtaining a directable light bundle generator placement; obtaining a directable light bundle generator orientation; receiving the camera stream; calculating a 2D projection; inserting a light bundle indicator; and providing the display stream.

The directable light bundle generator placement is of the directable light bundle generator relative to the performance environment. Typically, a reference point and/or reference axis is arranged somewhere in the performance environment, more specific somewhere on the stage. The reference point and/or reference axis is the same for the camera and the directable light bundle generator.

The directable light bundle generator orientation of the directable light bundle generator relative to the performance environment. The directable light bundle generator orientation is typically specified relative to the reference axis. The directable light bundle generator orientation may be expressed in a pan and a tilt value.

The 2D projection of the light bundle is based on the camera placement, the camera orientation, the directable light bundle generator placement, and the directable light bundle generator orientation. Based on the camera placement, the camera orientation, the directable light bundle generator placement, and the directable light bundle generator orientation, a 3D representation of the light bundle may be transformed to the 2D light bundle by projecting the 3D performer environment onto the 2D display surface. As an example, when the light bundle is represented by a set of 3D vectors and the 2D light bundle by a set of 2D vectors, the transformation may be presented by multiplying a 3×2 matrix with the set of 3D vectors for obtaining the 2D light bundle.

The light bundle indicator is for indicating the 2D projection of the light bundle in the camera stream for generating the display stream. The light bundle indicator may have any shape, form and/or size. The light bundle indicator is typically detectable by a human operator of the tracking system. The light bundle indicator provides a reference to the operator of where the light bundle in reality is.

The operator of the tracking system when tracking the performer with the directable light bundle generator may have difficulties manipulating the tracked location for following or tracking the performer as the tracked location is a floating point in 3D space being the performance environment.

The current tracking system advantageously allows the operator to associate the light bundle indicator with the point in space, typically relative to the stage, where the performer is located, such as where the part of the performer is that is lighten up with the light bundle. When manipulating the tracking location, the associated light bundle indicator is changing as well thereby advantageously improving the intuitive control of the tracked location. Practise has shown that without the light bundle indicator, the operator is more likely to overshoot and/or undershoot when tracking the performer. This intuitive control of the tracked location becomes even more apparent when the stage has different levels such as a sloped surface or a stepped part of the stage. When the operator over- or undershoots when tracking the performer, due to the different levels in the stage, the tracked location and consequently the light bundle of the directable light bundle generator may change in the Z-direction in such a way that the performer is not or partly not lighten up.

The improved tracking of the performer, resulting in less under- and/or overshoot, allows to reduce the cross-sectional size of the light bundle of the directable light bundle generator. The reduced cross-sectional size while still lighting up the performer provides the advantage of less light lighting up the performance environment. The light falling onto the performer and not or not as much on the performance environment provides a contrast as described above. The reduced amount of light lighting up the performance environment has the technical effect of increasing the contrast between the performer and the performance environment.

Furthermore, inserting a light bundle indicator in the display stream provides the advantage of showing where the light bundle will be while the light of that directable light bundle generator is switched off. With the help of the light bundle indicator, the operator obtains an impression of the effect and/or the lighten up area when the directable light bundle generator might be switched off. Thus, the light bundle indicator has the technical effect of allowing the operator to improve the tracking of the performer, more specifically the position of the tracked location, before the light bundle of the directable light bundle generator is switched on.

Furthermore, inserting a light bundle indicator in the display stream provides the advantage of showing where the light bundle will be while the performance environment is simulated. In the simulated environment, the light bundle indicator may advantageously allow the operator to practise with the tracking system and/or the light designers to have an improved anticipation of the effect of a light bundle of the directable light bundle generator. The effect of the light bundle may comprise to practise in simulation to prevent hitting certain areas or certain objects that should remain dark, not receive light from the light bundle or at least as less as possible light from the light bundle.

According to another aspect of the present disclosure, a computer implemented method for illuminating with a light bundle from a directable light bundle generator a performer at a tracked location on a performance environment, comprising: obtaining a camera placement of a camera arranged for viewing on the performance environment, wherein the camera placement is relative to the performance environment; obtaining a camera orientation of the camera relative to the performance environment; obtaining a directable light bundle generator placement of the directable light bundle generator relative to the performance environment; obtaining a directable light bundle generator orientation of the directable light bundle generator relative to the performance environment; receiving a camera stream from the camera, wherein the camera stream represents a 2D view on the performance environment of the camera; calculating a 2D projection of the light bundle based on the camera placement, the camera orientation, the directable light bundle generator placement and the directable light bundle generator orientation; inserting a light bundle indicator for indicating the 2D projection of the light bundle in the camera stream for generating the display stream; and providing the display stream to a display. The computer implemented method provides the same advantages as described for the other aspects or embodiments of the present disclosure.

According to another aspect of the present disclosure, a tracking system for tracking a performer located at a tracked location on a performance environment with a camera arranged for viewing on the performance environment, comprising: a camera command output for controlling the camera; a location tracker input for receiving a tracked location change from a location tracker; and a controller arranged for: obtaining a camera placement of the camera relative to the performance environment; obtaining a camera orientation of the camera relative to the performance environment; obtaining the tracked location; receiving the tracked location change from the location tracker input; changing the tracked location based on the tracked location change; calculating a camera orientation relative to the performance environment based on the tracked location; and providing the camera orientation to the camera command output for orienting the camera such that the camera follows the tracked location.

The camera command output is for controlling the camera couplable to the camera command output. The control of the camera comprises controlling the orientation of the camera. The camera orientation is typically expressed in tilt and pan value. The camera command output typically is capable of transmitting commands comprising a tilt setting and/or a pan setting. The camera command output may be a custom type output or a standardized type, such as HDMI, Ethernet, USB or COM port.

The location tracker input is for receiving a tracked location change from a location tracker. The location tracker input is couplable to a location tracker. The location tracker input is arranged for receiving a tracked location change from the location tracker. The location tracker is typically identifying a change as a relative change. Alternatively, the location tracker may detect an absolute change. The tracked location change from the location tracker may be read to include absolute changes, such as an absolute position. The location tracker may be a mouse, and the location tracker input a mouse console input. Alternatively, the location tracker may be a device placed on the performer generating a wireless signal for tracking the location of the performer on the stage. Alternatively, the location tracker may be a device placed on the performer generating a non-visible signal, such as an infrared signal, for tracking the location of the performer on the stage.

For this aspect of the present disclosure, the controller is arranged for the steps of: obtaining a camera placement; obtaining a camera orientation; obtaining the tracked location; receiving the tracked location change; changing the tracked location; calculating a camera orientation; and providing the camera orientation.

The tracked location change is received from the location tracker input. The tracked location change is typically associated with a change inputted into the location tracker. Such as a change provided by the location tracker may be moving the location tracker over a surface for some distance. Such a change provided by the location tracker may be manipulating a joystick and/or a trackball.

The tracked location is changed based on the tracked location change. This tracked location change is typically scaled and/or added to the tracked location. The tracked location change may also be rotated before adding and/or scaling. As an example, the tracked location change may indicate a location tracker changing 10 millimetre in a particular direction relative to a reference axis of the location tracker. The change of the tracked location may be 1 metre in an associated particular direction relative to the reference axis of the tracked location.

The camera placement is of the camera relative to the performance environment. Typically, a reference point and/ or reference axis is arranged somewhere in the performance environment, more specific somewhere on the stage. As an example, the centre of the stage or middle on the front of the stage facing the public may be selected as reference point. Reference axis may be selected as X direction parallel to the front of the public/the stage to the right for the public, Y direction from the stage straight into the public, and Z direction straight up from the stage.

The camera orientation of the camera relative to the performance environment. The camera orientation is typically specified relative to the reference axis. The camera orientation may be expressed in a pan and a tilt value. The camera orientation is calculated relative to the performance environment based on the tracked location. The camera orientation is further based on the camera placement. The camera orientation may be viewed as the orientation and/or direction of a vector starting at the camera placement and ending at the tracked location. The orientation and/or direction of this camera vector may be expressed in a pan and a tilt setting for the camera that is controlled by the tracking system.

The camera may follow the tracked location and consequently the tracked performer. As the camera tracks the performer, the field of view of the camera does not have to cover the full performance environment, typically the stage. The option of the reduced field of view provides the advantage of more accurately tracking a performer on the stage. The reduced field of view may further provide the advantage that the camera may zoom in on the tracked location for providing a higher resolution image of the part of the performance environment where the tracked location is at and thus the performer.

According to another aspect of the present disclosure, a computer implemented method for tracking a performer located at a tracked location on a performance environment with a camera arranged for viewing on the performance environment, comprising: obtaining a camera placement of the camera relative to the performance environment; obtaining a camera orientation of the camera relative to the performance environment; obtaining the tracked location; receiving a tracked location change from a location tracker; changing the tracked location based on the tracked location change; calculating a camera orientation relative to the performance environment based on the tracked location; and providing the camera orientation to the camera for orienting the camera such that the camera follows the tracked location. The computer implemented method provides the same advantages as described for the other aspects or embodiments of the present disclosure.

According to another aspect of the present disclosure, a tracking system for illuminating with a light bundle of a directable light bundle generator a performer at a tracked location on a performance environment, the tracking system comprising: a location tracker input for receiving a tracked location change from a location tracker; a directable light bundle generator command output for controlling the directable light bundle generator; a camera input for receiving a camera stream from a camera arranged for viewing on the performance environment, wherein the camera stream represents a 2D view on the performance environment of the camera; a display output for outputting a display stream; and a controller arranged for: obtaining a directable light bundle generator placement of the directable light bundle generator relative to the performance environment; obtaining a camera placement of the camera relative to the performance environment; obtaining a camera orientation of the camera relative to the performance environment; obtaining the tracked location; obtaining a height offset based on a performer height of the performer, wherein the height offset is indicative of a difference between the tracked location and the performance environment; obtaining a target offset based on the performer height, wherein the target offset is indicative of a height difference between a head of the performer and the performance environment; receiving the tracked location change from the location tracker input; changing the tracked location based on the tracked location change and the height offset; calculating a directable light bundle generator orientation relative to the performance environment based on the directable light bundle generator placement, and the tracked location; providing the directable light bundle generator orientation to the directable light bundle generator command output for orienting the directable light bundle generator such that the directable light bundle generator illuminates the tracked location on the performance environment; calculating a target location based on the tracked location, and the target offset; calculating a 2D target location based on the camera placement, the camera orientation, and the target location; receiving the camera stream from the camera input; inserting a target indicator for indicating the 2D target location in the camera stream for generating the display stream; and providing the display stream to the display output.

A directable light bundle generator command output couplable to a directable light bundle generator. The directable light bundle generator command output is arranged for controlling the directable light bundle generator. The directable light bundle generator is typically oriented with a tilt setting and a pan setting.

For this aspect of the present disclosure, the controller is arranged for the steps of: obtaining a directable light bundle generator placement; obtaining a camera placement; obtaining a camera orientation; obtaining the tracked location; obtaining a height offset; obtaining a target offset; receiving the tracked location; calculating a directable light bundle generator orientation; providing the directable light bundle generator orientation; calculating a target location; calculating a 2D target location; receiving the camera stream; inserting a target indicator; and providing the display stream.

The height offset is based on a performer height of the performer, wherein the height offset is indicative of a difference between the tracked location and the performance environment. The target offset is based on the performer height, wherein the target offset is indicative of a height difference between a head of the performer and the performance environment. The tracked location is changed based on the tracked location change and the height offset. This tracked location change is typically scaled and/or added to the tracked location. The tracked location change may also be rotated before adding and/or scaling. As an example, the tracked location change may indicate a location tracker changing 10 millimetre in a particular direction relative to a reference axis of the location tracker. The change of the tracked location may be 1 metre in an associated particular direction relative to the reference axis of the tracked location. The height offset is typically added to or subtracted from the tracked location in a predefined direction, such as in the vertical direction.

The directable light bundle generator orientation is calculated relative to the performance environment based on the directable light bundle generator placement, and the tracked location. The directable light bundle generator orientation may comprise a pan and a tilt value. The calculation may be seen as comprising two steps. The first step of calculating the vector in 3D space starting at the directable light bundle generator placement and ending at the tracked location. The second step of calculating the pan and tilt value of the directable light bundle generator for orienting the directable light bundle generator and thus the light bundle towards the tracked location.

The directable light bundle generator orientation is provided to the directable light bundle generator command output for orienting the directable light bundle generator such that the directable light bundle generator illuminates the tracked location on the performance environment.

The target location calculation is based on the tracked location, and the target offset. The target location is typically slightly higher relative to the performance environment, such as the stage. The 2D target location calculation is based on the camera placement, the camera orientation, and the target location. The target offset is typically added to or subtracted from the tracked location in a predefined direction, such as in the vertical direction. The target indicator is inserted for indicating the 2D target location in the camera stream for generating the display stream. The target indicator may have any shape, form and/or size.

The tracked location is the location that is lighten up by the light bundle of the directable light bundle generator. The light bundle of the directable light bundle generator typically has a centre line. The centre line may be an axis of symmetry or partial symmetry of the light bundle. The centre line typically coincides with the tracked location. The light bundle is typically conical and the centre line is typically the symmetry line of the cone. The tracked location is typically not arranged to the top of the head of the performer, but slightly lower. This provides the effect of lighten up the face or the head of the performer and typically also part of the shoulders and/or body. This provides that the amount of light from the light bundle of the directable light bundle generator that does not strike the performer is minimized. Minimizing the light that does not strike the performer has the advantages of increasing the contrast between the performer, specifically the face of the performer, and the performance environment, such as the stage and/or décor. The increased contrast provides the advantage of improved showing of the performer in the performance environment, specifically on the stage.

Furthermore, the target indicator is used by the operator to change the tracked location such that the target indicator is arranged over the head or face of the performer. The head or face of the performer is more easily tracked compared to the tracked location typically being somewhere around the throat of the performer. Thus, arranging the target indicator to an easy identifiable part of the performer, while the tracked location arranges the light bundle such that the performer is light up while minimizing the lighting up of the background provides the technical effect of enabling the operator to track the performer more optimally, such as more accurately, less undershoot and/or less overshoot and thus improving contrast. Only lighting up the head or face is typically used in theatre performances. Alternatively, the tracked location may be selected such that the whole performer is inside the light bundle. This alternative is typically used during rock performances. Another advantage is holding the target indicator on the performers head providing a relatively easy identifiable and/or trackable target, while the tracked location is kept such that part of the performer or the performer as a whole is light up. In another alternative embodiment, the target indicator identifies the 2D location in the display stream of the tracked location. In this alternative, the tracked location and the target location in 3D are the same and therefore are the same in 2D as well. Furthermore, in this specific case, the centre line of the light bundle coincides with the tracked location and thus the target location.

According to another aspect of the present disclosure, a computer implemented method for illuminating with a light bundle of a directable light bundle generator a performer at a tracked location on a performance environment, comprising: obtaining a directable light bundle generator placement of the directable light bundle generator relative to the performance environment; obtaining a camera placement of the camera relative to the performance environment; obtaining a camera orientation of the camera relative to the performance environment; obtaining the tracked location; obtaining a height offset based on a performer height of the performer, wherein the height offset is indicative of a difference between the tracked location and the performance environment; obtaining a target offset based on the performer height, wherein the target offset is indicative of a height difference between a head of the performer and the performance environment; receiving a tracked location change from a location tracker; changing the tracked location based on the tracked location change and the height offset; calculating a directable light bundle generator orientation relative to the performance environment based on the directable light bundle generator placement, and the tracked location; providing the directable light bundle generator orientation for orienting the directable light bundle generator such that the directable light bundle generator illuminates the tracked location on the performance environment; calculating a target location based on the tracked location, and the target offset; calculating a 2D target location based on the camera placement, the camera orientation, and the target location; receiving a camera stream from a camera arranged for viewing on the performance environment, wherein the camera stream represents a 2D view on the performance environment of the camera; inserting a target indicator for indicating the 2D target location in the camera stream for generating the display stream; and providing the display stream to a display. The computer implemented method provides the same advantages as described for the other aspects or embodiments of the present disclosure.

According to another aspect of the present disclosure, a computer program product comprising instructions which, when the program is executed by a suitable processor, cause the processor to carry out the method of as mentioned in the claims, embodiment, or description. The computer program product provides the same advantages as described for the other aspects or embodiments of the present disclosure.

DRAWINGS

Figure 2:
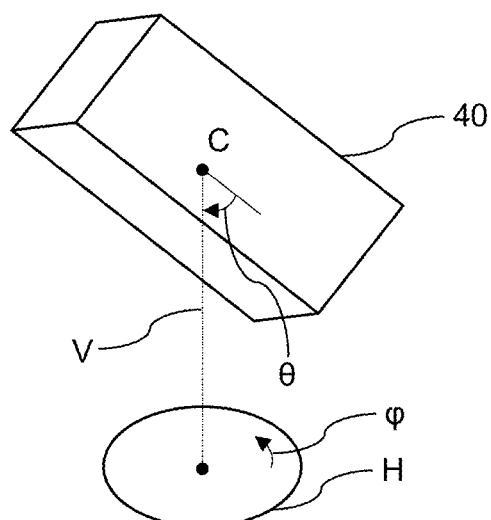
Figure 3:
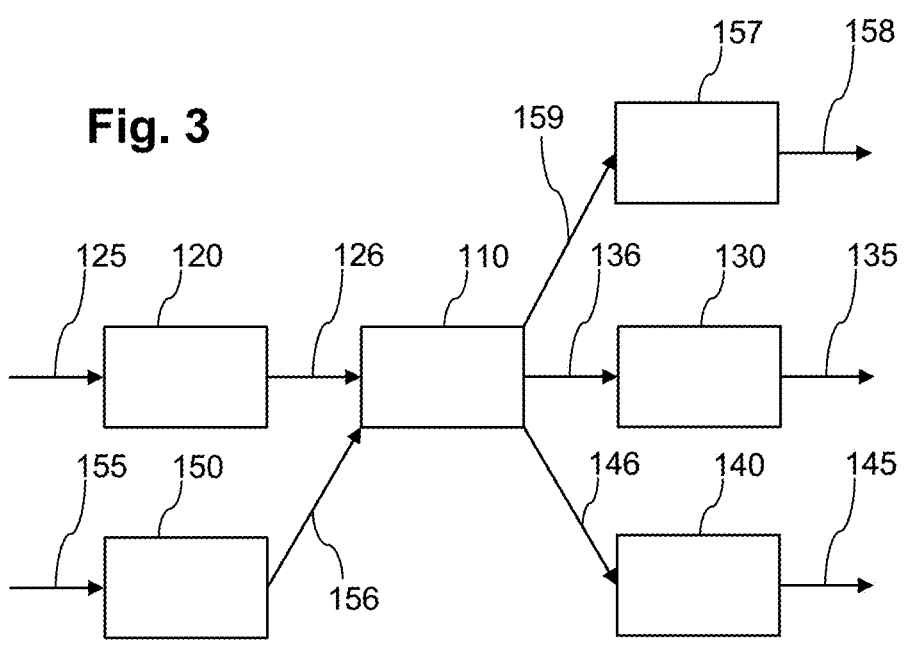
Figure 4:
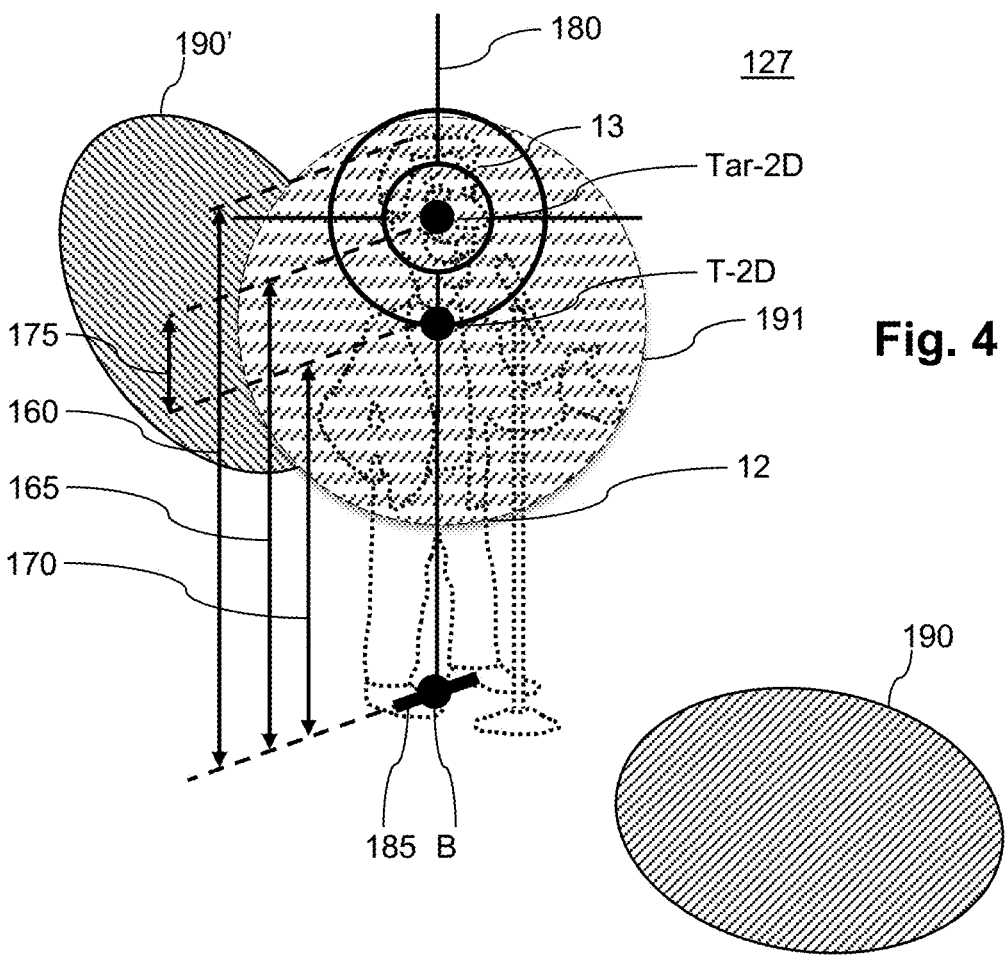
Figures 5, 6:
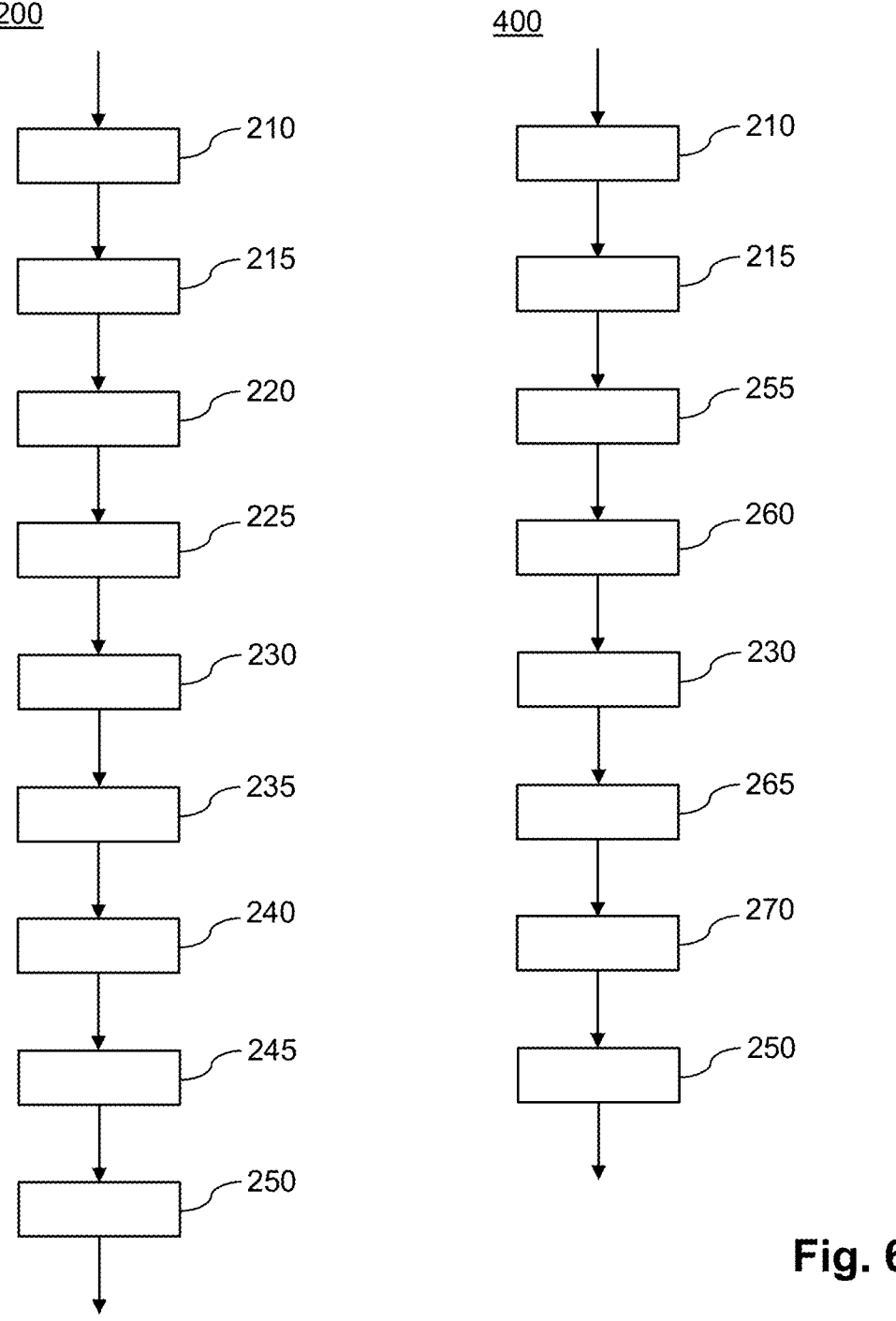

The present disclosure will be apparent from and elucidated further with reference to the embodiments described by way of example in the following description and with reference to the accompanying drawings, in which:

FIG. 1 schematically shows a performance environment;

FIG. 2 schematically shows a controlled object;

FIG. 3 schematically shows a tracking system according to the present disclosure;

FIG. 4 schematically shows a 2D view on the performance environment;

FIG. 5 schematically shows a method for a tracking system;

FIG. 6 schematically shows a method for a tracking system;

FIG. 7 schematically shows a method for a tracking system;

FIG. 8 schematically shows a method for a tracking system; and

Figure 9:
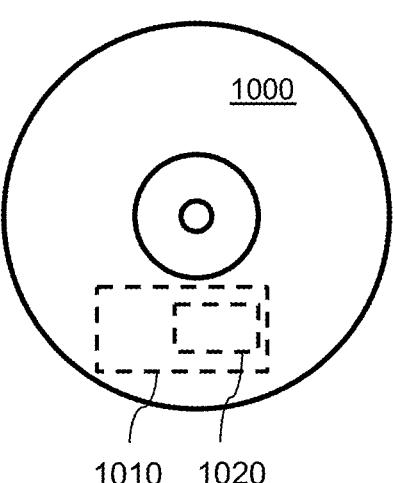

FIG. 9 schematically shows an embodiment of a computer program product, computer readable medium and/or non-transitory computer readable storage medium according to the present disclosure.

The figures are purely diagrammatic and not drawn to scale. In the figures, elements which correspond to elements already described may have the same reference numerals.

DESCRIPTION

In an embodiment of the tracking system, the base indicator advantageously indicates the area of the feet of the performer on the performance environment. The base indicator may be a line on the screen indicating the distance between the feet. The base indicator may be a circle or an oval indicating the area where the feet of the performer may or should be in contact with the performance environment, such as the stage. In a further embodiment of the tracking system, the base location advantageously coincides with the performance environment.

In an embodiment of the tracking system, the base indicator is a surface, such as a square or circle. In a further embodiment, the surface of the base indicator is aligned with the performance environment or coincides with a part of the performance environment, such as the stage. Furthermore, the surface of the base indicator is preferably advantageously in perspective view in the display stream. In a further embodiment of the tracking system, the base indicator is a line section, wherein preferably the line section is shown as a horizontal line section in the display stream.

In an embodiment of the tracking system, the controller is arranged for: calculating a target location based on the tracked location; calculating a 2D target location based on the camera placement, the camera orientation, and the target location; and inserting a target indicator for indicating the 2D target location in the display stream. Enabling that the target location is different from the tracked location provides the advantage that the operator may track the more easily tracked head of the performer by placing the target indicator over the head of the performer, while the tracked location and thus the light bundle is placed at a location such that part of the performer or the whole performer is light up while the background is not light up for enhancing the contrast between the part or whole of performer and the background.

In an embodiment of the tracking system, the target indicator is a crosshair. The crosshair may advantageously leave room in the middle such that the face or head of the performer is visible unobstructed by the target indicator.

In an embodiment of the tracking system, the controller is arranged for: inserting an associating indicator for associating the base indicator and the target indicator together in the display stream. The associating indicator may be a line section joining the based indicator and the target indicator. Visually associating the base indicator with the target indicator provides the advantage of decreasing the possibility of confusion by the operator, typically when multiple performers are tracked on the same display.

In an embodiment, the tracking system comprises a location tracker input for receiving a tracked location change from a location tracker; wherein the controller is arranged for: receiving the tracked location change from the location tracker input; and changing the tracked location based on the tracked location change providing the advantage of actively following the performer.

In a further embodiment of the tracking system, changing the tracked location comprises changing the tracked location in a surface parallel to the performance environment and based on the tracked location change. If the performance environment is flat the surface is a plane parallel to the performance environment. If the performance environment, such as the stage, has a stepped or a sloped area, the parallel surface follows this stepped or sloped area. This allows less of the light bundle to fall onto the background thereby advantageously enhancing the contrast between the performer and the background. In a further embodiment of the tracking system, changing the tracked location is advantageously performed such that the base location remains coinciding with the performance environment. In a further embodiment of the tracking system, the controller is arranged for retrieving a model of the performance environment; and changing the tracked location is advantageously also based on the model of the performance environment.

In a further embodiment of the tracking system, changing the tracked location comprises changing the tracked location in a vertical direction based on the model of the performance environment. This may be advantageous when a performer bends down or jumps up. This is especially advantageous when multiple directable light bundle generators from different angles follow the same tracked location. In a further embodiment of the tracking system, changing the tracked location in a vertical direction comprises maintaining the tracked location at the height offset in the vertical direction relative to the performance environment. This embodiment may also be advantageous for performance environments having vertically moving elements where the performer may be on, such as an elevator.

In an embodiment of the tracking system, the tracked location is a 3D location. The 3D location may be expressed in Cartesian, polar or spherical coordinates. The 2D location may be expressed in Cartesian or polar coordinates. The 3D orientation may be expressed in pan and tilt setting. The 3D orientation may be expressed in a 3D vector.

In an embodiment of the tracking system, calculating the 2D projection of the light bundle comprises: virtually arranging a shape representing at least partly the light bundle based on the directable light bundle generator placement and the directable light bundle generator orientation; and calculating a 2D projection of the shape based on the camera placement and the camera orientation. The light bundle shape, representing at least partly the light bundle of the directable light bundle generator, may have any shape advantageously providing the operator with information regarding the light bundle, such as position and/or what is lighten up. The shape may comprise showing the surface that is lighten up, such as part of the performer and/or part of the performance environment that is light up. The shape may comprise showing at least partly the light bundle between the directable light bundle generator and the surface whereupon the light impinges.

In a further embodiment of the tracking system, the shape is an elongated shape having an elongated axis; and the tracked location is on the elongated axis. The elongated axis is typically a centre axis and/or symmetry axis of the light bundle. Further, tracked location is typically a point on the centre axis and/or symmetry axis. In a further embodiment of the tracking system, the shape is advantageously a symmetrical shape having a symmetry axis; and the tracked location is on the symmetry axis. In a further embodiment of the tracking system, the shape is cone, truncated cone, cylinder, pyramid, or truncated pyramid. The shape is typically advantageously mimicking the shape of the shape of the light bundle for improved insight of the operator of the effect of the light bundle.

In a further embodiment of the tracking system, the shape has a volume; and the tracked location is in the volume. The shape therefore advantageously shows and/or identifies the tracked location. In a further embodiment, an indication is inserted in the display stream for identifying the tracked location next to the light bundle indicator. In a further embodiment of the tracking system, the shape at least partly coincides with the boundaries of the light bundle. The shape therefore advantageously shows and/or identifies the boundaries of the light bundle for providing improved information to the operator about the light bundle. In a further embodiment of the tracking system, the shape comprises a side and the side advantageously coincides with the edge of the light bundle.

In a further embodiment of the tracking system, the shape is a spherical shape having a centre equal to the tracked location and having a radius such that the spherical shape and the light bundle share a tangent circle. This shape advantageously provides the operator with insight on which part of the performer, typically located at the tracked location, is light up.

In an embodiment of the tracking system, the controller is arranged for obtaining the tracked location; and calculating the 2D projection is also based on the tracked location. As the performer is typically located at or close to the tracked location, the 2D projection may provide an improved insight of which part of the performer is light up by the light bundle. In a further embodiment of the tracking system, calculating the 2D projection of the light bundle comprises advantageously calculating the 2D projection at the tracked location.

In an embodiment of the tracking system, calculating the 2D projection comprises virtually projecting the light bundle on the performance environment. Virtually projecting provides the advantage of showing where the light bundle will be while the light of that directable light bundle generator is switched off. With the help of the virtual projection of the light bundle indicator, the operator obtains an impression of the effect and/or the lighten up area when the directable light bundle generator might be switched off. Thus, the virtual projection has the technical effect of allowing the operator to improve the tracking of the performer, more specifically the position of the tracked location, before the light bundle of the directable light bundle generator is switched on. Furthermore, virtual projection provides the advantage of showing where the light bundle will be while the performance environment is simulated. In the simulated environment, the light bundle indicator may advantageously allow the operator to practise with the tracking system and/or the light designers to have an improved anticipation of the effect of a light bundle of the directable light bundle generator.

In a further embodiment of the tracking system, the controller is arranged for obtaining a model of the performance environment; and calculating a 2D projection of the light bundle is also based on the model of the performance environment. The model of the performance environment may comprise the surface of the stage. The model of the performance environment may comprise the décor and/or background. The model may comprise a mesh describing the surface of the stage, the décor and/or the background. The model advantageously provides that the light of the light bundle not striking the performer but the performance environment may be shown in the display stream.

In an embodiment of the tracking system, the controller is arranged for obtaining a directable light bundle generator light parameter of the directable light bundle generator; and calculating a 2D projection of the light bundle is also based on the directable light bundle generator light parameter. The directable light bundle generator light parameter may comprise a zoom parameter, a focus parameter, an iris parameter, a shutter blade parameter and/or a shutter parameter. The focal parameter typically influences or controls the setting of lenses in the directable light bundle generator for adapting the focal point of the light bundle of the directable light bundle generator. The zoom parameter typically influences or controls the opening angle of the fixture or directable light bundle generator. The iris parameter typically influences the aperture of the directable light bundle generator for adapting the amount of light coming from the directable light bundle generator. The shutter blade parameter typically influences the shutter blades or frame blades of the directable light bundle generator for adapting the shape of the light bundle of the directable light bundle generator. The light bundle indicator, more specific the 2D projection of the light bundle, with an improved representation of the light bundle provides advantageously more information to the operator for improved arranging of the light bundle and/or the tracked location to the performer.

In an embodiment of the tracking system, the controller is arranged for: obtaining a second directable light bundle generator placement of a second directable light bundle generator relative to the performance environment, wherein the second directable light bundle generator illuminates with a second light bundle the performer at the tracked location; obtaining a second directable light bundle generator orientation of the second directable light bundle generator relative to the performance environment; calculating a 2D projection of the second light bundle based on the camera placement, the camera orientation, the second directable light bundle generator placement and the second directable light bundle generator orientation; and inserting a second light bundle indicator for indicating the second 2D projection of the second light bundle in the display stream. This embodiment allows for simplified tracking with multiple directable light bundle generators. In a further embodiment, the light bundle indicator and/or the second light bundle indicator can be switched on and off independently to advantageously allow the operator to obtain an improved insight of what is light up by the light bundle and/or the second light bundle for improved tracking of the performer. In a further embodiment of the tracking system, the light bundle indicator and the second light bundle indicator are different. This embodiment provides the advantage of having both indicators present in the display stream while the operator may distinguish between the two indicators, such that the effect of the light bundles individually as well as in combination may be presented at the same time.

In an embodiment of the tracking system, the controller is arranged for: obtaining the tracked location; obtaining a height offset based on the performer height; calculating a base location based on the tracked location and the height offset; calculating a 2D base location based on the camera placement, the camera orientation, and the base location; and inserting a base indicator for indicating the 2D base location in the display stream. This embodiment advantageously combines the inserting of the base indicator with the light bundle indicator for enhancing both advantages and/or improving the tracking of the performer.

In an embodiment of the tracking system, calculating the camera orientation comprises applying a control loop keeping the tracked location in view. The control loop provides the advantage of smoothly following the tracked location. The control loop may comprise a PID controller.

In an embodiment of the tracking system, calculating the camera orientation comprises applying a camera control loop for keeping the tracked location in the centre of the view. The control loop provides the advantage of smoothly following the tracked location. The control loop may comprise a PID controller.

In an embodiment of the tracking system, the controller is arranged for obtaining a tracked location change threshold; and calculating a camera orientation comprises leaving the camera orientation unchanged when the tracked location change is below the tracked location change threshold. The threshold provides the advantage that jittering and/or uncontrolled small orientation changes of the camera orientation are advantageously prevented when the tracked location is stable, is substantially stable, or make small movements.

In an embodiment of the tracking system, the tracking system comprises a directable light bundle generator command output for controlling the directable light bundle generator tracking the tracked location with a light bundle; and the controller is arranged for: obtaining a directable light bundle generator placement of the directable light bundle generator relative to the performance environment; calculating a directable light bundle generator orientation relative to the performance environment based on the directable light bundle generator placement, and the tracked location; and providing the directable light bundle generator orientation to the directable light bundle generator command output for orienting the directable light bundle generator such that the directable light bundle generator illuminates the tracked location on the performance environment. The tracking system, next to controlling the camera orientation advantageously controls the directable light bundle generator to both orient them such that they are oriented towards the tracked location.

In a further embodiment of the tracking system, calculating the directable light bundle generator orientation comprises applying a directable light bundle generator control loop for keeping the tracked location in the centre of the light bundle. The control loop for the directable light bundle generator provides the advantage of smoothly following the tracked location. The control loop for the directable light bundle generator may comprise a PID controller.

In a further embodiment of the tracking system, the directable light bundle generator control loop tracks the tracked location advantageously differently compared to the camera control loop. In a further embodiment, the directable light bundle generator control loop more aggressively tracks the tracked location compared to the camera control loop. The directable light bundle generator control loop may follow the tracked location much faster to keep the performer at the tracked location always in the light, while in contrast the camera control loop may follow the tracked location much slower to keep the tracked location only in the field of view of the camera and provide a more stable or slowly changing image to the operator for improved tracking of the performer substantially at the tracked location or kept at the tracking location by changing the tracked location.

In an embodiment of the tracking system, the tracking system comprises: a display output for outputting a display stream; and a camera input for receiving a camera stream from the camera, wherein the camera stream represents a 2D view on at least part of the performance environment; and the controller is arranged for: receiving the camera stream from the camera input; calculating a 2D tracked location based on the camera placement, the camera orientation, and the tracked location; inserting a tracked indicator for indicating the 2D tracked location in the camera stream for generating the display stream; and providing the display stream to the display output. This embodiment advantageously combines inserting the tracked indicator with the camera tracking the tracked location for advantageously enhancing both advantages and/or providing the advantage of indicating the tracked location at a higher resolution due to the decreased field of view of the camera.

In a further embodiment of the tracking system, the controller is arranged for: obtaining tracked location filter parameters for low pass filtering the tracked location change; obtaining a tracked location change threshold; calculating a change indicator by applying a low pass filter configured with the tracked location filter parameters and the tracked location change threshold; calculating a camera zoom setting based on the change indicator; and providing the camera zoom setting to the camera command output for controlling the zoom of the camera. This embodiment provides the advantage of automatically zooming the camera such that the field of view is reduced during that the tracked location does not change that much while the field of view is increased during that the tracked location does change much. This allows the operator to track the performer by changing the tracked location much more accurately at moments of low and high movement of the performer.

In a further embodiment of the tracking system, the camera zoom setting indicates to the camera to zoom in, when the change indicator indicates low change levels; and the camera zoom setting indicates to the camera to zoom out, when the change indicator indicates high change levels. This embodiment advantageously adapts the zoom setting and as a result the field of view of the camera according to the change in the tracked location.

In a further embodiment of the tracking system, the controller is arranged for: obtaining a directable light bundle generator placement of the directable light bundle generator relative to the performance environment; obtaining a directable light bundle generator orientation of the directable light bundle generator relative to the performance environment; calculating a 2D projection of the light bundle based on the camera placement, the camera orientation, the directable light bundle generator placement and the directable light bundle generator orientation; and inserting a light bundle indicator for indicating the 2D projection of the light bundle in the display stream. This embodiment advantageously combines inserting the light bundle indicator with the camera tracking the tracked location for advantageously enhancing both advantages and/or providing the advantage of indicating the tracked location at a higher resolution due to the decreased field of view of the camera for improved tracking.

In a further embodiment of the tracking system, the controller is arranged for: obtaining a height offset based on the performer height; calculating a base location based on the tracked location and the height offset; calculating a 2D base location based on the camera placement, the camera orientation, and the base location; and inserting a base indicator for indicating the 2D base location in the display stream for generating the display stream. This embodiment advantageously combines inserting the base indicator with the camera tracking the tracked location for advantageously enhancing both advantages and/or providing the advantage of indicating the tracked location at a higher resolution due to the decreased field of view of the camera for improved tracking.

In an embodiment of the tracking system, the height offset is smaller than the target offset. Showing the performer typically requires that the light bundle shows the head of the performer and a part or the whole of the body of the performer. The centre of the light bundle is therefore typically held on the throat or chest of the performer to light up the performer and less lighting up the background for enhancing the contrast between the performer and the background. The target indicator is advantageously held focussed on or directed to the head due to its ease for the operator to keep the target indicator on a body part of the performer, such as the head of the performer, while the centre of the light bundle is held at the target location. The difference between the height offset and the target offset, specifically the height offset being smaller than the target offset allows to enhance the contrast while providing improved ease of tracking to the operator.

In an embodiment of the tracking system, the target indicator is a crosshair. This advantageously allows to track a body part of the performer, such as the head of the performer, with relative ease. The crosshair may comprise an opening in the middle for improved showing of the head in the middle of the crosshair.

In an embodiment of the tracking system, the target offset and the height offset are selected such that when the target indicator is targeting the head of the performer, the tracked location causes the directable light bundle generator to illuminate at least the head, and the shoulders of the performer, preferably also at least part of the chest of the performer. Showing the performer typically requires that the light bundle shows the head of the performer and a part or the whole of the body of the performer. The centre of the light bundle is therefore typically held on the throat or chest of the performer to light up the performer and less lighting up the background for enhancing the contrast between the performer and the background. The target indicator is advantageously held focussed on or directed to the head due to its ease for the operator to keep the target indicator on a body part of the performer, such as the head of the performer. The difference between the height offset and the target offset, specifically the height offset being smaller than the target offset allows to enhance the contrast while providing improved ease of tracking to the operator.

In an embodiment of the tracking system, the controller is arranged for: obtaining a light bundle size indication of the directable light bundle generator; and changing the target offset based on the light bundle size indication and the height offset. The top of the light bundle is preferable held just above the top of the head of the performer. The centre of the light bundle is held at tracked location. Thus, depending on the size of the light bundle and the length of the performer, the tracked location may be at a height relative to the performance environment, such as the stage for lighting up the performer. The current embodiment advantageously allows to adjust the height of the tracked location depending on the size of the light bundle, typically the shape and/or diameter of the light bundle.

In an embodiment of the tracking system, the height offset and/or the target offset are advantageously offsets in a vertical direction, preferably in an upwards direction.

In an embodiment of the tracking system, the tracking system is arranged for illuminating with a second light bundle of a second directable light bundle generator a second performer at a second tracked location on the performance environment, the tracking system comprising: a second location tracker input for receiving a second tracked location change from a second location tracker; a second directable light bundle generator command output for controlling the second directable light bundle generator; and a controller arranged for: obtaining a second directable light bundle generator placement of the second directable light bundle generator relative to the performance environment; obtaining the second tracked location; obtaining a second height offset based on a second performer height of the second performer, wherein the second height offset is indicative of a difference between the second tracked location and the performance environment; obtaining a second target offset based on the second performer height, wherein the second target offset is indicative of a height difference between a head of the second performer and the performance environment; receiving the second tracked location change from the second location tracker input; changing the second tracked location based on the second tracked location change and the second height offset; calculating a second directable light bundle generator orientation relative to the performance environment based on the second directable light bundle generator placement, and the second tracked location; providing the second directable light bundle generator orientation to the second directable light bundle generator command output for orienting the second directable light bundle generator such that the second directable light bundle generator illuminates the second tracked location on the performance environment; calculating a second target location based on the second tracked location, and the second target offset; calculating a second 2D target location based on the camera placement, the camera orientation, and the second target location; and inserting a second target indicator for indicating the second 2D target location in the display stream. A second performer is advantageously lit up with the second directable light bundle generator. This embodiment advantageously allows to track two or even more performers with the same tracking system reducing hardware usage. In a further embodiment of the tracking system, the second height offset is smaller than the second target offset for providing the same advantageous as mentioned for the height offset and the target offset.

In a further embodiment of the tracking system, the target indicator and the second target indicator are different, preferably different in colour, appearance and/or shape. The target indicators being different advantageously allows to easily track the multiple performers with the same display stream.

In an embodiment of the tracking system, the tracking system is arranged for illuminating with a third light bundle of a third directable light bundle generator the performer at the tracked location on the performance environment; the tracking system comprises a third directable light bundle generator command output for controlling the directable light bundle generator; and the controller is arranged for: obtaining a third directable light bundle generator placement of the third directable light bundle generator relative to the performance environment; calculating a third directable light bundle generator orientation relative to the performance environment based on the third directable light bundle generator placement, and the tracked location; and providing the third directable light bundle generator orientation to the third directable light bundle generator command output for orienting the third directable light bundle generator such that the third directable light bundle generator illuminates the tracked location on the performance environment. This embodiment advantageously allows to light up the performer with multiple directable light bundle generators for improved lighting up the performer for increasing the contrast with the performance environment, such as the background.

In an embodiment of the tracking system, the controller is arranged for: calculating a directable light bundle generator light parameter of the directable light bundle generator based on the height offset and the target offset for optimizing the ratio of light of the light bundle on the performer relative to the light of the light bundle on the performance environment; and providing the directable light bundle generator light parameter to the directable light bundle generator command output. The directable light bundle generator light parameter may comprise a shutter parameter for changing the shape and/or size of the light bundle. As an example, the shutter parameter may shape the light bundle to be square pyramid, rectangular pyramid or conically shaped. As an example, the shutter parameter may limit the light bundle to a particular size square, size rectangle or circle diameter. Optimizing the ratio advantageously improves the contrast between the performer and the performance environment, such as the background of the stage.

In an embodiment of the tracking system, the controller is arranged for: obtaining a directable light bundle generator orientation of the directable light bundle generator relative to the performance environment; calculating a 2D projection of the light bundle based on the camera placement, the camera orientation, the directable light bundle generator placement and the directable light bundle generator orientation; and inserting a light bundle indicator for indicating the 2D projection of the light bundle in the display stream.

In an embodiment of the tracking system, the controller is arranged for: calculating a base location based on the tracked location and the height offset; calculating a 2D base location based on the camera placement, the camera orientation, and the base location; and inserting a base indicator for indicating the 2D base location in the display stream for generating the display stream. The based indication advantageously provides the relation between the tracked location and the performance environment, more specifically the stage.

In an embodiment of the tracking system, the tracking system comprises a camera command output for controlling the camera; and the controller is arranged for: calculating a camera orientation relative to the performance environment based on the tracked location; and providing the camera orientation to the camera command output for orienting the camera such that the camera follows the tracked location. This allows for the field of view of the camera to be such that the complete performance environment, more specifically the stage, does not have to be in view. The camera may then zoom in for improved tracking of the performer. Therefore, the light bundle may advantageously be selected smaller for enhancing the contrast between the performer and the performance environment.

In a further embodiment of the tracking system, calculating a camera orientation is also based on the second tracked location; and the controller is arranged for: calculating a camera zoom setting based on the tracked location and the second tracked location; and the camera orientation and the camera zoom setting are calculated such that the tracked location and the second tracked location are in view of the camera. The camera may zoom in for improved tracking of the performer. Therefore, the light bundle may advantageously be selected smaller for enhancing the contrast between the performer and the performance environment.

FIG. 1 schematically shows a performance environment 10. The performance environment typically comprises a stage 11. The stage is where the performer may walk on. Although a flat stage is shown, the stage may comprise elevations, stairs, lifts or other elements providing a static or dynamic height difference.

Dots in the figure identify different locations. The dotted lines provide an indication how the locations relative to the performance environment should be seen in 3D. At the front middle side of the stage is the reference point (R). The leading edge of the stage is typically used as reference direction as indicated. The X direction is parallel to the front of the public/the stage to the right for the public, the Y direction from the stage straight away from the public and straight into the stage, and Z direction straight up from the stage. Alternative directions may be used.

The exemplary performance environment comprises two directable light bundle generators, such as two follow spots, placed in different directable light bundle generator placements 20, 20', and one camera placed in a camera placement 30. As an example, a tracked location T is shown as well as a target location Tar.

FIG. 2 schematically shows a controlled object 40. The controlled object may be a follow spot, a camera, or any other object of which the orientation may be controlled in the context of the performance environment.

In the current example, the orientation of the camera of FIG. 1 may be shown. The camera has a field of view typically extending over the complete stage. The camera is typically rotated around a centre point C. Relative to a horizontal plane H, the controlled object is rotated over an angle $\varphi$ typically labelled as pan. Relative to a vertical axis V, the controlled object is rotated over an angle $\theta$ typically labelled as tilt. The pan and tilt together provide an orientation of the controlled object. The combination of the location of the controlled object, such as the camera or follow spots in FIG. 1, with the orientation as shown in FIG. 2 provides the attitude of the controlled object.

FIG. 3 schematically shows a tracking system 100 according to the present disclosure. The tracking system comprises a controller 110. The controller is typically arranged to perform steps or execute software comprising the steps, such as the steps from the specified methods.

The tracking system may comprise a camera input 120. The camera input is arranged for receiving a camera stream 125 from a camera. The camera stream represents typically digital what is in the field of view of the camera. The camera input provides the camera stream as internal camera stream 126 to the controller.

The tracking system may comprise a location tracker input 150. The location tracker is arranged for receiving a tracked location change 155 from a location tracker. The location tracker may be a mouse, joystick, trackball or any other computer interface device able to register a change. The tracked location change may be associated to a position change of the location tracker or other input to the location tracker. The location tracker input provides the tracked location change as internal tracked location change 156 to the controller.

The tracking system may comprise a display output 130. The display output may be a HDMI, DisplayPort, VGA, or any standardized display output. The display output is arranged for providing a display stream 135. The display stream represents typically digital the processed camera stream processed by the controller. The display output receives the display stream as internal display stream 136 from the controller.

The tracking system may comprise a camera command output 140. The camera command output is arranged for providing camera commands 145 to the camera. The camera commands may comprise a pan and tilt setting for the camera. In some embodiments the camera input and the camera command output may share a single physical port, such that the tracking system is linked to the camera via a single communication cable. The camera command output may be a USB or Ethernet port. The camera command output receives the camera commands as internal camera commands 146 from the controller.

The tracking system may comprise a directable light bundle generator command output 157. The directable light bundle generator command output may be a USB or Ethernet port. The directable light bundle generator command output is arranged for providing directable light bundle generator commands 158. The directable light bundle generator commands may comprise a pan and tilt setting for the directable light bundle generator. The directable light bundle generator command output receives the directable light bundle generator commands as internal directable light bundle generator commands 159 from the controller.

Multiple ports, such as input ports and output ports, may be combined over a single port, such as a single Ethernet port or USB port, for reducing the number of communication cables coupled to the tracking system.

FIG. 4 schematically shows a 2D view 127 on the performance environment. Shown is a performer 12 having a head 13. The performer has a performer height 160.

Further shows as dots a 2D tracked location T-2D, a 2D target location Tar-2D, and a 2D base location B. These dots are typically not shown in the display stream during normal operation. The 2D target location is the centre of the target indicator 180. The 2D target location is the 2D projection of the target location e.g. in FIG. 1. The 2D tracked location is the 2D projection of the tracked location e.g. in FIG. 1. The base location is typically the point in space where the stage intersects the vertical axis through the tracked location and the target location. The 2D base location is the 2D projection of this intersection point.

The target indicator is for the operator to easily overlay the target indicator over the performer, typically the head of the performer. The position of the target indicator is typically manipulated, specifically indirectly manipulated, via providing tracked location changes to the location tracker input.

The point in space where the performer stays on the stage may be indicated with a base indicator 185.

Relative to the base location, the tracked location is arranged at a tracked location height or height offset 170. Relative to the base location, the target location is arranged at a target height 165. A target offset 175 is defined as the difference between the target location and the tracked location. The tracked location is typically based on the performer height. The tracked location is typically the centre line of the light bundle from the directable light bundle generator directed to the tracked location. Depending on the requirements, the tracked location may be set such that the light bundle only sheds light on the head and shoulders. Alternatively, the tracked location may be set such that the light bundle sheds light on the performer from tip to toe. Many alternative settings are possible with as common denominator that the setting is depending on the height of the performer. The target location is typically coinciding with the head of the performer or at least follows the head of the performer, as shown in FIG. 4 for the 2D projection. Other body parts or even the performer as a whole may be selected to get into the target indicator in the 2D projection.

FIG. 4 further shows light bundle indicators 190, 190' e.g. of respective directable light bundle generators at directable light bundle generator locations shown in FIG. 1. Specifically, the first light bundle indicator 190 may show where the light bundle of the first directable light bundle generator at the first directable light bundle generator placement 20 reflects on the stage, and the second light bundle indicator 190' may show where the light bundle of the second directable light bundle generator at the second directable light bundle generator placement 20' reflects on the stage. Alternative light bundle indicators e.g. at alternative locations as claimed and described are possible although not shown in FIG. 4. The light bundle indicator 191 may show the part of the performer light up. Specifically in simulation, the light bundle indicator may advantageously show which part of the performer is light up before the light is actually switched on. The light bundle indicator 191 may be shown as a hatched circle or circle with pattern filing, as shown in FIG. 4. Alternatively, the light bundle indicator 191 may be shown as a pattern only on the performer. For this embodiment, the system may comprise object tracking for showing the pattern only on the performer. The light bundle indicator 191 may show the combination of light bundles of several directable light bundle generators targeting the same performer or tracked location.

FIG. 5 schematically shows a method 200 for a tracking system. The method is computer implemented for illuminating with a directable light bundle generator a performer at a tracked location on a performance environment. The performer has a performer height. The method comprises steps. Depending on the interdependency between the steps, the steps may be performed multiple times, in parallel, in a different order, and/or in loops.

The first step is obtaining 210 a camera placement of a camera arranged for viewing on the performance environment. The camera placement is relative to the performance environment. The next step is obtaining 215 a camera orientation of the camera relative to the performance environment. The next step is obtaining 220 the tracked location. The next step is obtaining 225 a height offset based on the performer height. The next step is receiving 230 a camera stream from the camera. The camera stream represents a 2D view on the performance environment of the camera. The next step is calculating 235 a base location based on the tracked location and the height offset. The next step is calculating 240 a 2D base location based on the camera placement, the camera orientation, and the base location. The next step is inserting 245 a base indicator for indicating the 2D base location in the camera stream for generating the display stream. The next step is providing 250 the display stream to a display.

In an alternative embodiment, the steps of obtaining the tracked location and calculating 235 a base location are reversed for obtaining the same effect. The method therefore comprises the steps of obtaining a base location and calculating a tracked location based on the base location and the height offset.

Furthermore, a tracked location change from a location tracker may instead of directly changing the tracked location indirectly change the tracked location with the steps of receiving the location change from the location tracker input; changing the base location based on the location change; and calculating the tracked location based on the base location and the height offset. Further, changing the base location may also be based on the model of the performance environment.

FIG. 6 schematically shows a method 400 for a tracking system. The method is a computer implemented for illuminating with a light bundle from a directable light bundle generator a performer at a tracked location on a performance environment. The method comprises steps. Depending on the interdependency between the steps, the steps may be performed multiple times, in parallel, in a different order, and/or in loops.

The first step is obtaining 210 a camera placement of a camera arranged for viewing on the performance environment. The camera placement is relative to the performance environment. The next step is obtaining 215 a camera orientation of the camera relative to the performance environment. The next step is obtaining 255 a directable light bundle generator placement of the directable light bundle generator relative to the performance environment. The next step is obtaining 260 a directable light bundle generator orientation of the directable light bundle generator relative to the performance environment. The next step is receiving 230 a camera stream from the camera. The camera stream represents a 2D view on the performance environment of the camera. The next step is calculating 265 a 2D projection of the light bundle based on the camera placement, the camera orientation, the directable light bundle generator placement and the directable light bundle generator orientation. The next step is inserting 270 a light bundle indicator for indicating the 2D projection of the light bundle in the camera stream for generating the display stream. The next step is providing 250 the display stream to a display.

FIG. 7 schematically shows a method 500 for a tracking system. The method is a computer implemented method for tracking a performer located at a tracked location on a performance environment with a camera arranged for viewing on the performance environment. The method comprises steps. Depending on the interdependency between the steps, the steps may be performed multiple times, in parallel, in a different order, and/or in loops.

The first step is obtaining 210 a camera placement of the camera relative to the performance environment. The next step obtaining 215 a camera orientation of the camera relative to the performance environment. The next step obtaining 220 the tracked location. The next step receiving 270 a tracked location change from a location tracker. The next step changing 275 the tracked location based on the tracked location change. The next step calculating 280 a camera orientation relative to the performance environment based on the tracked location. The next step providing 285 the camera orientation to the camera for orienting the camera such that the camera follows the tracked location.

FIG. 8 schematically shows a method 600 for a tracking system. The method is computer implemented for illuminating with a light bundle of a directable light bundle generator a performer at a tracked location on a performance environment. The method comprises steps. Depending on the interdependency between the steps, the steps may be performed multiple times, in parallel, in a different order, and/or in loops.

The first step is obtaining 255 a directable light bundle generator placement of the directable light bundle generator relative to the performance environment. The next step is obtaining 210 a camera placement of the camera relative to the performance environment. The next step is obtaining 215 a camera orientation of the camera relative to the performance environment. The next step is obtaining 220 the tracked location. The next step is obtaining 225 a height offset based on a performer height of the performer. The height offset is indicative of a difference between the tracked location and the performance environment. The next step is obtaining 290 a target offset based on the performer height. The target offset is indicative of a height difference between a head of the performer and the performance environment. The next step is receiving 270 a tracked location change from a location tracker. The next step is changing 275 the tracked location based on the tracked location change and the height offset. The next step is calculating 300 a directable light bundle generator orientation relative to the performance environment based on the directable light bundle generator placement, and the tracked location. The next step is providing 305 the directable light bundle generator orientation for orienting the directable light bundle generator such that the directable light bundle generator illuminates the tracked location on the performance environment. The next step is calculating 310 a target location based on the tracked location, and the target offset. The next step is calculating 315 a 2D target location based on the camera placement, the camera orientation, and the target location. The next step is receiving 230 a camera stream from a camera arranged for viewing on the performance environment. The camera stream represents a 2D view on the performance environment of the camera. The next step is inserting 320 a target indicator for indicating the 2D target location in the camera stream for generating the display stream. The next step is providing 250 the display stream to a display.

It is noted that changing the tracked location may also be based on field of view and/or zoom of the camera.

FIG. 9 schematically shows an embodiment of a computer program product 1000, computer readable medium 1010 and/or non-transitory computer readable storage medium according to the present disclosure comprising computer readable code 1020. The compounding system typically comprises a controller arranged for executing one or more of the methods as specified throughout the description and claims as typically coded in software.

Examples, embodiments or optional features, whether indicated as non-limiting or not, are not to be understood as limiting the present disclosure as claimed. It should be noted that the figures are purely diagrammatic and not drawn to scale. In the figures, elements which correspond to elements already described may have the same reference numerals.

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The term "functionally" will be understood by, and be clear to, a person skilled in the art. The term "substantially" as well as "functionally" may also include embodiments with "entirely", "completely", "all", etc. Hence, in embodiments the adjective functionally may also be removed. When used, for instance in "functionally parallel", a skilled person will understand that the adjective "functionally" includes the term substantially as explained above. Functionally in particular is to be understood to include a configuration of features that allows these features to function as if the adjective "functionally" was not present. The term "functionally" is intended to cover variations in the feature to which it refers, and which variations are such that in the functional use of the feature, possibly in combination with other features it relates to in the present disclosure, that combination of features is able to operate or function. For instance, if an antenna is functionally coupled or functionally connected to a communication device, received electromagnetic signals that are receives by the antenna can be used by the communication device. The word "functionally" as for instance used in "functionally parallel" is used to cover exactly parallel, but also the embodiments that are covered by the word "substantially" explained above. For instance, "functionally parallel" relates to embodiments that in operation function as if the parts are for instance parallel. This covers embodiments for which it is clear to a skilled person that it operates within its intended field of use as if it were parallel.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the present disclosure described herein are capable of operation in other sequences than described or illustrated herein.

The devices or apparatus herein are amongst others described during operation. As will be clear to the person skilled in the art, the present disclosure is not limited to methods of operation or devices in operation.

It should be noted that the above-mentioned embodiments illustrate rather than limit the present disclosure, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The present disclosure may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The present disclosure further applies to an apparatus or device comprising one or more of the characterising features described in the description and/or shown in the attached drawings. The present disclosure further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

LIST OF REFERENCE SYMBOLS

10 performance environment
11 stage
12 performer
13 head
20, 20' directable light bundle generator placement
30 camera placement
40 controlled object
100 tracking system
110 controller
120 camera input
125 camera stream
126 camera stream internal
127 2D view on performance environment
130 display output
135 display stream
136 display stream internal
140 camera command output
145 camera commands
146 camera commands internal
150 location tracker input
155 tracked location change
156 tracked location change internal
157 directable light bundle generator command output
158 directable light bundle generator commands
159 directable light bundle generator commands internal
160 performer height
165 target height
170 tracked location height or height offset
175 target offset
180 target indicator
185 base indicator
190, 190' light bundle indicator
191 light bundle indicator at alternative location
200 method for illuminating with a directable light bundle generator
210 obtaining camera placement
215 obtaining camera orientation
220 obtaining tracked location
225 obtaining height offset
230 receiving camera stream
235 calculating base location
240 calculating 2D base location
245 inserting base indicator
250 providing display stream
255 obtaining directable light bundle generator placement
260 obtaining directable light bundle generator orientation
265 calculating 2D projection light bundle
270 receiving tracked location change
275 changing tracked location
280 calculating camera orientation
285 providing camera orientation
290 obtaining target offset

300 calculating directable light bundle generator orientation
305 providing directable light bundle generator orientation
310 calculating target location
315 calculating 2D target location
400 method for illuminating with a directable light bundle generator
500 method for illuminating with a directable light bundle generator
600 method for illuminating with a directable light bundle generator
φ pan
Θ tilt
B 2D base location
C centre point
H horizontal plane
R reference point
T tracked location
Tar
target location
T-2D 2D tracked location
Tar-2D 2D target location
V vertical axis
1000 computer program product
1010 computer readable medium
1020 computer readable code

What is claimed is:

1. A tracking system for tracking a performer located at a tracked location on a performance environment with a camera arranged for viewing on the performance environment, the tracking system comprising:
   a camera command output for controlling the camera;
   a location tracker input for receiving a tracked location change from a location tracker;
   a display output for outputting a display stream;
   a camera input for receiving a camera stream from the camera, wherein the camera stream represents a 2D view on at least part of the performance environment; and
   a controller configured to perform operations including:
      obtaining a camera placement of the camera relative to the performance environment,
      obtaining a camera orientation of the camera relative to the performance environment,
      obtaining the tracked location,
      receiving the tracked location change from the location tracker input,
      changing the tracked location based on the tracked location change,
      calculating the camera orientation relative to the performance environment based on the tracked location,
      providing the camera orientation to the camera command output for orienting the camera such that the camera follows the tracked location,
      receiving the camera stream from the camera input,
      calculating a 2D tracked location based on the camera placement, the camera orientation, and the tracked location,
      inserting a tracked indicator for indicating the 2D tracked location in the camera stream for generating the display stream, and
      providing the display stream to the display output.
2. The tracking system of claim 1, wherein calculating the camera orientation comprises applying a control loop keeping the tracked location in view.

3. The tracking system of claim 1, wherein calculating the camera orientation comprises applying a camera control loop for keeping the tracked location in the centre of the view.
4. The tracking system of claim 1, wherein the controller is arranged for obtaining a tracked location change threshold.
5. The tracking system of claim 4, wherein calculating the camera orientation comprises leaving the camera orientation unchanged when the tracked location change is below the tracked location change threshold.
6. The tracking system of claim 1, wherein the tracking system comprises a directable light bundle generator command output for controlling the directable light bundle generator tracking the tracked location with a light bundle.
7. The tracking system of claim 6, wherein the controller is configured to perform further operations including:
   obtaining a directable light bundle generator placement of the directable light bundle generator relative to the performance environment,
   calculating a directable light bundle generator orientation relative to the performance environment based on the directable light bundle generator placement, and the tracked location, and
   providing the directable light bundle generator orientation to the directable light bundle generator command output for orienting the directable light bundle generator such that the directable light bundle generator illuminates the tracked location on the performance environment.
8. The tracking system of claim 7, wherein calculating the directable light bundle generator orientation comprises applying a directable light bundle generator control loop for keeping the tracked location in the centre of the light bundle.
9. The tracking system of claim 8, wherein the directable light bundle generator control loop tracks the tracked location differently compared to the camera control loop.
10. The tracking system of claim 9, wherein the directable light bundle generator control loop tracks the tracked location faster compared to the camera control loop.
11. The tracking system of claim 1, wherein the controller is configured to perform further operations including:
   obtaining tracked location filter parameters for low pass filtering the tracked location change,
   obtaining a tracked location change threshold,
   calculating a change indicator by applying a low pass filter configured with the tracked location filter parameters and the tracked location change threshold,
   calculating a camera zoom setting based on the change indicator, and
   providing the camera zoom setting to the camera command output for controlling the zoom of the camera.
12. The tracking system of claim 11, wherein the camera zoom setting indicates to the camera to zoom in when the change indicator indicates low change levels.
13. The tracking system of claim 12, wherein the camera zoom setting indicates to the camera to zoom out when the change indicator indicates high change levels.
14. The tracking system of claim 1, wherein the controller is configured to perform further operations including:
   obtaining a directable light bundle generator placement of the directable light bundle generator relative to the performance environment,
   obtaining a directable light bundle generator orientation of the directable light bundle generator relative to the performance environment, calculating a 2D projection of the light bundle based on the camera placement, the camera orientation, the directable light bundle generator placement and the directable light bundle generator orientation, and inserting a light bundle indicator for indicating the 2D projection of the light bundle in the display stream.

15. The tracking system of claim 1, wherein the controller is configured to perform further operations including:

obtaining a height offset based on the performer height, calculating a base location based on the tracked location and the height offset, calculating a 2D base location based on the camera placement, the camera orientation, and the base location, and inserting a base indicator for indicating the 2D base location in the display stream for generating the display stream.

16. A computer-implemented method for tracking a performer located at a tracked location on a performance environment with a camera arranged for viewing on the performance environment, the computer-implemented method comprising:

obtaining a camera placement of the camera relative to the performance environment;

obtaining a camera orientation of the camera relative to the performance environment;

obtaining the tracked location;

receiving a tracked location change from a location tracker input;

changing the tracked location based on the tracked location change;

calculating a camera orientation relative to the performance environment based on the tracked location;

providing the camera orientation to the camera for orienting the camera such that the camera follows the tracked location;

receiving the camera stream from the camera input;

calculating a 2D tracked location based on the camera placement, the camera orientation, and the tracked location;

inserting a tracked indicator for indicating the 2D tracked location in the camera stream for generating the display stream; and providing the display stream to the display output.

17. A computer program product comprising at least one non-transitory computer readable medium having a set of executable instructions which, when executed by a processor, cause the processor to perform operations including:

obtaining a camera placement of the camera relative to the performance environment;

obtaining a camera orientation of the camera relative to the performance environment;

obtaining the tracked location;

receiving a tracked location change from a location tracker input;

changing the tracked location based on the tracked location change;

calculating a camera orientation relative to the performance environment based on the tracked location; and providing the camera orientation to the camera for orienting the camera such that the camera follows the tracked location;

receiving the camera stream from the camera input;

calculating a 2D tracked location based on the camera placement, the camera orientation, and the tracked location;

inserting a tracked indicator for indicating the 2D tracked location in the camera stream for generating the display stream; and providing the display stream to the display output.

18. A tracking system for tracking a performer located at a tracked location on a performance environment with a camera arranged for viewing on the performance environment, the tracking system comprising:

a camera command output for controlling the camera;

a location tracker input for receiving a tracked location change from a location tracker;

a display output for outputting a display stream;

a camera input for receiving a camera stream from the camera, wherein the camera stream represents a 2D view on at least part of the performance environment; and a controller configured to perform operations including:

obtaining a height offset based on the performer height, a camera placement of the camera relative to the performance environment, and a camera orientation of the camera relative to the performance environment, calculating a base location based on the tracked location and the height offset, calculating a 2D base location based on the camera placement, the camera orientation, and the base location, and inserting a base indicator for indicating the 2D base location in the display stream for generating the display stream.

* * * * *